Feb. 13, 1962  C. A. HEUER  3,020,633
FABRICATION OF HOLLOW ARTICLES
Filed April 24, 1959  3 Sheets-Sheet 1

INVENTOR.
CHARLES A. HEUER
BY
ATTORNEYS

Feb. 13, 1962     C. A. HEUER     3,020,633
FABRICATION OF HOLLOW ARTICLES

Filed April 24, 1959     3 Sheets-Sheet 2

INVENTOR.
CHARLES A. HEUER

BY
ATTORNEYS

Feb. 13, 1962  C. A. HEUER  3,020,633
FABRICATION OF HOLLOW ARTICLES
Filed April 24, 1959  3 Sheets-Sheet 3

INVENTOR.
CHARLES A. HEUER
BY
ATTORNEYS

United States Patent Office 3,020,633
Patented Feb. 13, 1962

3,020,633
FABRICATION OF HOLLOW ARTICLES
Charles Archibald Heuer, East Alton, Ill., assignor to Olin Mathieson Chemical Corporation, East Alton, Ill., a corporation of Virginia
Filed Apr. 24, 1959, Ser. No. 808,723
6 Claims. (Cl. 29—421)

This invention relates to the fabrication of hollow articles and more particularly to the fabrication of hollow cup-shaped vessels provided with distended laminations continuously disposed within and about the periphery of the side walls of said vessels.

In the heat exchanger art, it is often desirable to fabricate heat exchanger panels into cup-shaped or tubular form, for example, a four wall structure surrounding either a freezer or a food compartment in conventional home refrigerators. Heretofore, such compartments were fabricated by bending a panel into circular or rectangular forms and joining the abutting edges by some appropriate manner as by welding or soldering. Variations occur in this process such as by providing integral and extending tab portions which are folded up against one end of the tubular compartment to which it is joined to form the end wall thereof. This method of fabricating is conventionally employed when an original panel is provided with appropriate passages for a heat exchange fluid, such as a refrigerant in evaporator panels.

However, this method has attended disadvantages since it can only be applied with extreme difficulty where the fluid passages are desired to be disposed continuously about the periphery of the compartment. In view of such disadvantages, the fluid passages are appropriately disposed about the flat panel, prior to fabrication into a compartment, to terminate short of the abutting edges. However, where a pattern of fluid passage is, nevertheless, desired to be disposed continuously within and about the periphery of the compartment, the fluid passages are so disposed as to have a plurality of terminal portions terminating at the abutting edges whereat complementary passages are mated. This results in complex problems of not only providing a pattern so that complementary passages are correctly mated at the abutting edges, but in addition, involve problems of sealing to prevent leakage of the heat exchange fluid. Irrespective of either of the methods above involved, additional problems occur in insuring effectiveness of the joining affected between the abutting edges particularly when a closed end tubular configuration is desired as a sealing cover for hermetically sealed units requiring an absolute preclusion of deleterious atmospheres, such as for a refrigerator compressor.

An alternate method of fabricating the above units has heretofore resided in forming a seamless tubular duct devoid of passages. Thereafter appropriate tubing is then wound about the periphery of the formed tubular duct, and joined thereto by soldering or welding. However, in this alternate method, the resultant assembly is provided with a plurality of interfaces between the tubing, joint and compartment which decreases the efficiency of heat transfer from a heat exchange fluid in the tubing of the interior of the compartment.

Another object of this invention is to provide a novel method for forming novel partially laminated cup-shaped vessels from flat metal sheets partially laminated in accordance with a predetermined configuration.

Still another object of this invention is to provide a novel method for forming seamless continuous and uninterrupted cup-shaped metal surfaces provided with continuous peripheral passages disposed within the confines of said metal.

A still further object of this invention is to provide a novel method for obtaining cup-shaped articles having fluid passages within the wall of said article and peripherally circumscribing the side walls of said article within said walls.

The manner in which the above objects and other objects and advantages are achieved will become more apparent from the following description and drawings in which.

Figure 1:
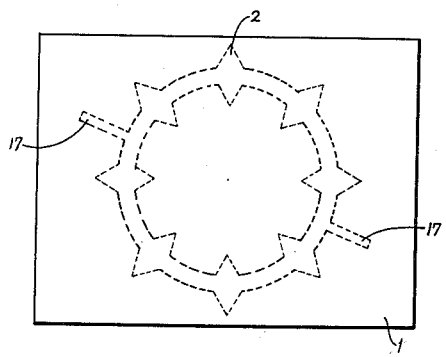
FIGURE 1 is a plan view of a partially laminated sheet of metal employed for illustrating an embodiment of this invention.
Figure 2:
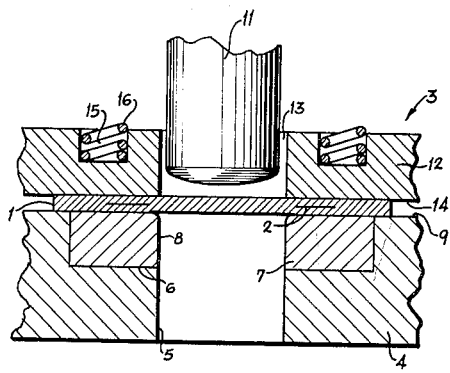
FIGURE 2 is an elevational view partially in cross-section illustrating an embodiment of this invention employed in forming cup-shaped articles from the metal of FIGURE 1.
Figure 3:
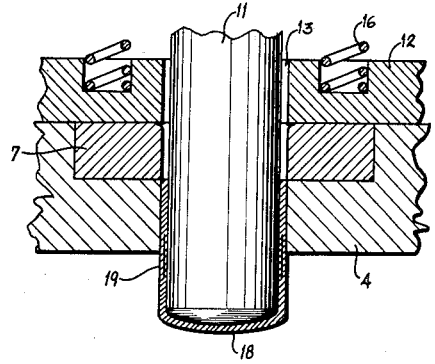
FIGURE 3 is an elevational view partially in cross-section depicting FIGURE 2 near the completion of working a metal sheet in accordance with this invention.

Referring to the drawings, a partially laminated flat metal sheet 1 is formed in accordance with the well-known process of fabricating such panels fully disclosed in a patent to Grenell, U.S. Patent No. 2,690,002, granted on September 28, 1954. According to the method defined in this patent, a foreshortened pattern of weld inhibiting material is applied to a clean surface of a sheet of metal and a clean surface of a second sheet of metal is superimposed on this surface. The two sheets are then secured to prevent relative movement between them, and are then welded together by hot rolling in the adjacent areas of the sheets which are not separated by weld inhibiting material. Hot rolling of the sheets results in reducing the thickness of the two sheets and elongating the resultant blank in a direction of rolling while the width of the resultant blank remains substantially the same. During elongation, the foreshortened pattern of weld inhibiting material is also elongated to provide the pattern desired in the resultant blank. Following the hot rolling operation, the resultant blank is usually softened as by annealing to make it more pliable and if desired may be then cold rolled to finish gauge and again softened as by annealing. The use of the weld inhibiting material results in unjoined portions between the outer surfaces of the blank. After softening the blank, the unjoined portion is then expanded by injecting therein a fluid pressure of sufficient magnitude to permanently distend the blank in the area of the unjoined portion to form the desired pattern of passageways.

In accordance with the method of the aforesaid patent, a sheet of metal 1 of .060 inch thick, 12 inches long and 12 inches in width was fabricated from 1100 ASTM type aluminum and has provided therein a partially laminated interior, or unjoined portion, 2 in a predetermined configuration. The sheet 1 is then placed within a forming means generally indicated by 3. The forming means or press 3 comprises a die holder 4 suitably mounted on a support means not shown. Die holder 4 is provided with a central circular opening 5 and an annular groove 6 into which is mounted a female die 7 also provided with a circular opening 8 in cooperating relationship with opening 5 of die holder 4. The upper surfaces 9 and 10 of die holder 4 and die 8, respectively, form supporting surfaces for the metal sheet 1 which is suitably mounted thereon by a suitable means not shown.

Female die member 7 and holder 4 are complementary to a punch 11 and are adapted to receive said punch during drawing of sheet 1. The punch has, as is understood, a proper operating clearance between the walls of die 7 and die holder 4.

Mounted about punch 11 is a blank holder 12 provided with an aperture 13 to permit punch 11 to work therethrough. In addition, blank holder 12 is provided with a lower plane surface 14 in cooperating relationship with supporting surfaces 9 and 10, of die holder 4 and die 7, respectively, to clamp sheet 1 therebetween. As is known in the art, the blank holder 12 presses the peripheral portions of sheet 1 between it and the cooperating surfaces of the die holder and die so that proper drawing can be effected. Blank holder 12 is also provided with a recess 15 into which are mounted suitable springs 16 suitably and cooperatively connecting punch 11, by means not shown, to die holder 12. Springs 16 exert suitable compression, through blank holder 12, on the edges of periphery of sheet 1 restricting their movement thereof to give a stretching action on these areas to allow the metal to flow evenly during its drawing by means of the aforesaid assembly.

Although a specific apparatus has been described in which the punch and die are described as circular, it is to be understood that any suitable conventional drawing apparatus may be substituted therefor. In addition, it is also to be understood that although a circular punch and a female die with a circular opening were employed, other configurations such as rectangular, elliptical and the like, may also be employed.

In operation, a force is applied to punch 11 to lower the punch and blank holder 12 downwardly wherein the blank holder 4 and die 7, respectively, and the punch is urged against sheet 1. The punch continues downwardly against sheet 1 forcing it into the circular openings of female die member 7 and die holder 4 to form a cylindrical cup-shaped member into conformance with the configuration of punch 11 and the annular space between the punch and die 7. The end product 18 has a seamless side wall and end wall with a continuous surface entirely free of welded slits and flanges with a continuous and uninterrupted lamination 19 circumscribing the side walls of the resultant member.

As noted above, the seamless cup-shaped vessel containing the distended lamination is ideally suited as a cover for hermetically sealed compressors having no welded seams with attendant dangers of leaks breaking the hermetic seal to the compressor.

Figure 4:
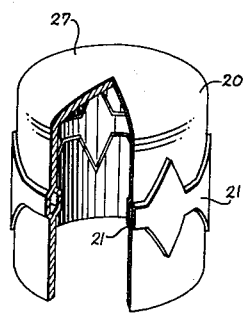
FIGURE 4 is a perspective view partly in cross-section illustrating an article formed from the metal sheet of FIGURE 1, in accordance with this invention.
Figure 5:
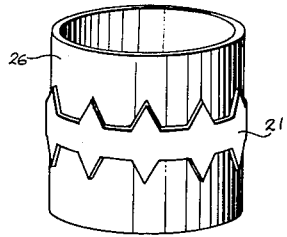
FIGURE 5 illustrates an embodiment of a tubular article obtained in accordance with this invention.

If desired, the cup-shaped member may be trimmed at this stage or after a subsequent distention of the laminations. Alternatively, if trimming of sheet 1 is desired during drawing of it into a cup-shaped member, it may be accomplished by providing punch 11 with a shearing or cutting shoulder, not shown, adapted to coact with die 7, at the end of the working stroke, to effect the desired trimming. The trimming may be accomplished so that the laminated portion 17 of sheet 1 extends to the trimmed edges of the cup-shaped member wherein it is forced open for insertion of a suitable nozzle to permit expansion, or distention, of the laminations by a suitable fluid pressure. The expansion of the cup-shaped member may be accomplished freely without restraint or it may be accomplished by any other convenient method, such as by positioning the cup-shaped member between rigid surfaces, resembling a punch and die set, and distending the laminations against the surfaces to obtain a flat top configuration. The resultant blank 20 provided with the distended laminations 21 is illustrated in FIGURE 4.

Alternately to the shearing operation described above, the cup-shaped member formed from sheet 1 may be trimmed to have the laminated portion 17 terminating short of the trimmed edges to provide inlet and outlet conduits in the finished article. Expansion may be accomplished by appropriately drilling through the outer wall of the cup-shaped member 20 to a depth extending to the lamination at the ends of the laminated portions 17. A suitable nozzle is inserted into the cavity through which a suitable fluid pressure is injected to extend the laminations. The nozzle is then withdrawn and suitable inlet and outlet connections may be inserted in the openings provided.

Figure 6:
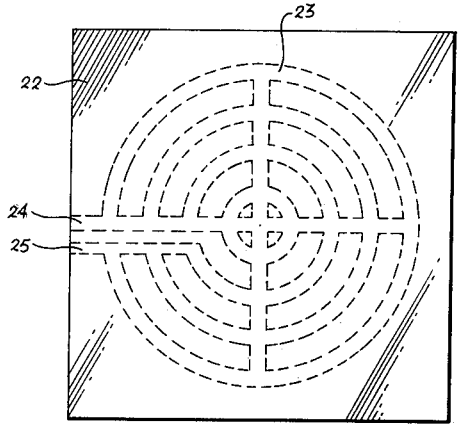
FIGURE 6 is a plan view of a partially laminated sheet of metal employed for illustrating another embodiment of this invention.

Although the invention has been described above with respect to the forming of cup-shaped vessels, it is to be understood that tubular articles, such as 26, may also be obtained in accordance with this invention by merely severing the end wall 27 from the cup-shaped article. In addition, although the simplest pattern of laminations have been illustrated, it can be readily seen that the laminations may be provided to extend within the end wall of the cup-shaped article suitably interconnected to the laminations in the side walls of the cup-shaped vessel. These laminations may take any desired simple or complicated pattern as in FIGURE 6 and may be provided within sheet 1 or other sheets, suitably disposed by means known in the art, to give the ultimate disposition of the pattern desired in the cup-shaped vessel. A more complicated pattern than that employed in FIGURE 1 is illustrated in FIGURE 6 showing a partially laminated sheet 22 containing a pattern of laminations 23 having portions 24 and 25 extending to the edge of the sheet.

It is to be understood that in accordance with the above, the laminated portions 24 and 25 may terminate short of the sheet edges. The forming of sheet 22 to a cup-shaped member 28 will be described with specific reference to the embodiment disclosed in FIGURES 7 and 8.

Figure 7:
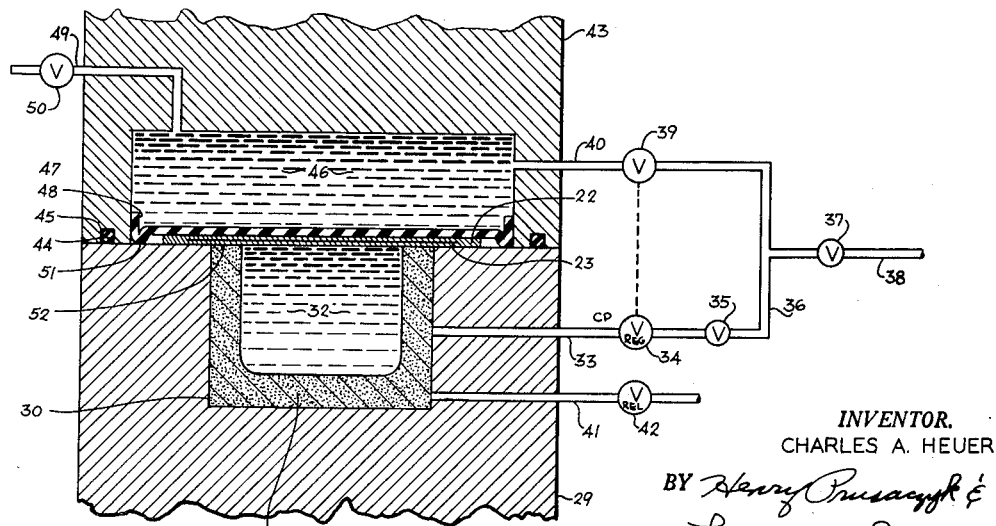
FIGURE 7 is an elevational view in cross-section illustrating another embodiment of this invention.
Figure 8:
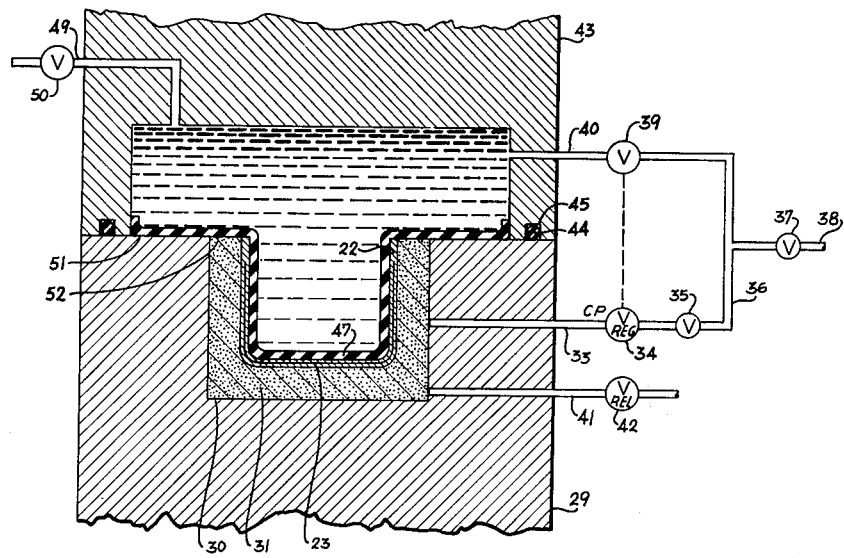
FIGURE 8 illustrates the embodiment of FIGURE 7 near the completion of forming a partially laminated metal sheet in accordance with this invention.

The forming apparatus of FIGURE 7 comprises a die holder 29 suitably mounted on a support, not shown, and is provided with a suitable die chamber 30 in which a female die 31 is mounted. Die 31 is shaped to provide the desired contour in a flat metal sheet formed and may be made of any suitable material by conventional methods. Only the simplest die cavity 32 has been illustrated, however, it is to be understood that the cavity may be of any complex shape desired. Although die 31 may be solid and impervious to fluids, it is illustrated as being formed in a porous structure fabricated from non-compressible sponge metal to provide for flow of hydraulic fluid thereto during forming operations. However, if an impervious die is employed, venting is provided from the forming face for relief of pressures, from the die cavity, during forming operations.

Die holder 29 is also provided with an inlet conduit 33 having a suitable constant pressure regulator 34 and a valve 35 to form a communication means between die chamber 30 and a header 36 which in turn is suitably connected through a valve 37 in conduit 38 to a source of hydraulic supply. Constant pressure regulator 34 is operatively connected to a valve 39 in a conduit 40 extending from header 36. Constant pressure regulator 34 is adapted to be responsive to pressure within die cavity 32 to open or close valve 39 in response to a predetermined pressure level in die cavity 32. If desired, check valves may be provided in conduits 33 and 40 on the outlet side of valve regulator 34 and valve 39, respectively, to insure against any back flow of the hydraulic fluid. The particular pressure level, if desired, may be made dependent on the fluid head in die cavity 32 so as to actuate constant pressure regulator 34 when the die cavity is full. The die cavity 32 and die chamber 30 are also provided with a suitable venting conduit 41 through a suitable pressure regulator or valve relief means 42 adapted to be actuated at or above the pressure setting of constant pressure regulator 34. It is, of course, to be understood that the portions of the conduits externally of the forming structure may be flexible.

A coacting section 43 is suitably mounted to a conventional reciprocating means, not shown, for raising and lowering section 43 to and away from mating or operating relationship with die holder 29. Coacting section 43 is maintained in sealing relationship with die holder 29 by means of O-ring 44 mounted in annular groove 45. Coacting section 43 is further provided with a compartment 46 for receiving and containing a suitable hydraulic fluid, such as water, air and the like, from conduit 40 in communicating relationship with compartment 46. The hydraulic fluid is maintained within compartment 46 by means of a resilient diaphragm 47, such as rubber and the like, across the compartment opening and sealed therein by means of portions 48.

Preferably the resilient diaphragm 47 is designed to have sufficient strength to be undeformed by a full head of hydraulic fluid within compartment 46 when maintained therein at zero p.s.i.g. Venting for compartment 46 is accomplished by means of a conduit 49 provided with a valve 50.

A partial laminated sheet, such as sheet 22 in FIGURE 6, is placed to rest on support surfaces 51 and 52 of die holder 29 and die 31 and coacting section 43 is brought downwardly in mating relationship with die holder 29. On closure, diaphragm 47 rests against metal sheet 22. Prior to operation, valves 35, 37 and 50 are closed, and in the initial operation as will be readily seen, compartment 46 is devoid of any hydraulic fluid.

In operation, valves 35 and 37 are open to permit access of hydraulic fluid through conduits 33 and 40. However, since die cavity 32 is below a predetermined pressure level, constant pressure regulator 34 maintains valve 39 closed while permitting the hydraulic fluid to enter through porous die 31 into die cavity 32. As soon as the hydraulic fluid reaches a predetermined pressure level in die cavity 32, as for example, as when the cavity has a full head, constant valve regulator 34 opens valve 39 to permit the hydraulic fluid to enter into compartment 46 which after filling begins to exert a uniform pressure against the partially laminated sheet 22. As with the preceding example, the pressure exerted on partially laminated sheet 22 compresses peripheral portions of sheet 22 against supporting surfaces 51 and 52 to exert a restricting movement thereon giving a stretching action on these areas to allow the metal to flow evenly without distortion.

Figure 9:
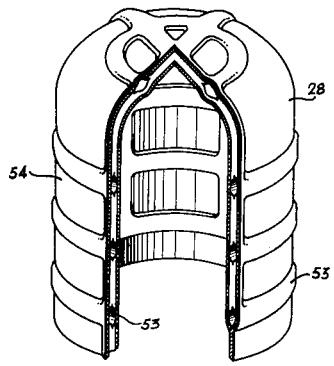
FIGURE 9 is a perspective view partially in cross-section illustrating a cup-shaped vessel obtained from the partially laminated sheet of FIGURE 6 in accordance with this invention.

As the hydraulic pressure within compartment 46 builds up above the pressure in die cavity 32, it forces partially laminated sheet 22 into die cavity 32. As the partially laminated sheet 22 is drawn into die cavity 32, the hydraulic fluid in the die cavity is forced out through relief valve or regulator 42 in conduit 41. This vented hydraulic fluid may be either dumped or returned to the hydraulic fluid supply. Preferably, relief valve 42 is maintained to vent the hydraulic fluid at a pressure maintained slightly above the setting of valve regulator 34 to prevent introduction of additional fluid into die cavity 32 and to permit a continuous and uninterrupted flow into compartment 46. After finishing of the drawing operation, valves 35 and 37 are closed and valve 50 opened to vent the hydraulic fluid in compartment 46. Where the resilient diaphragm 47 has sufficient strength to maintain, without deformation, a full head of hydraulic fluid in compartment 46, upon opening of valve 50 and resilient diaphragm 47 will tend to return to its normal and undeformed shape forcing the excess hydraulic fluid out through venting conduit 49. Thereafter, coacting section 43 is raised to permit removal of the drawn cup-shaped vessel 52. After removal, the laminations 23 may be distended by injection of appropriate fluid pressure in the same manner discussed above. The cup-shaped end product 54 drawn from sheet 22, with distended laminations 53, is illustrated in FIGURE 9.

Although this invention has been described with particular reference to a partially laminated panel fabricated in accordance with the methods specifically disclosed in the aforesaid U.S. Patent No. 2,690,002, it is to be understood that the invention is equally applicable to partially laminated blanks fabricated by other processes. Therefore, although the invention has been described with reference to specific embodiments, materials and details, various modifications and changes, within the scope of this invention, will be apparent to one skilled in the art and are contemplated to be embraced within the invention.

What is claimed is:

1. A method of forming hollow articles comprising providing a flat metal sheet partially laminated in a predetermined pattern, mechanically working said sheet into a cup-shaped member, and distending the laminations of said member with fluid pressure.

2. A method for forming hollow closed end cylinders comprising providing a flat metal sheet partially laminated in a predetermined pattern, mechanically working said sheet into a closed end hollow cylinder, and distending the laminations in said cylinder with fluid pressure.

3. A method for forming hollow closed end cylinders comprising fabricating a flat metal sheet partially laminated in a predetermined pattern to provide laminations in the side walls of said cylinder, mechanically working said sheet into a hollow closed end cylinder and distending the laminations with fluid pressure.

4. The method of claim 3 wherein the end wall of said closed end cylinder is removed.

5. The method of claim 3 wherein said closed end cylinder is mechanically worked by drawing.

6. A method of forming hollow articles comprising providing a flat metal sheet partially laminated in a predetermined pattern, placing said sheet adjacent a forming die adapted to impart to said sheet a cup-shaped configuration, applying pressure to said sheet to force it against the configuration of said die, and distending the laminations of the formed sheet with fluid pressure.

References Cited in the file of this patent

UNITED STATES PATENTS

| | | |
|---|---|---|
| 1,407,202 | Kubler | Feb. 21, 1922 |
| 1,685,402 | Grossweishede | Sept. 25, 1928 |
| 1,709,865 | Muffly | Apr. 23, 1929 |
| 1,835,863 | Greve | Dec. 8, 1931 |
| 2,690,002 | Grenell | Sept. 28, 1954 |
| 2,754,572 | Johnson | July 17, 1956 |
| 2,822,151 | Heuer | Feb. 4, 1958 |
| 2,830,800 | Gerhardt | Apr. 15, 1958 |
| 2,859,509 | Adams | Nov. 11, 1958 |
| 2,933,806 | Bleikamp | Apr. 26, 1960 |